United States Patent Office 3,328,471
Patented June 27, 1967

3,328,471
PROCESS FOR THE PRODUCTION OF
TERTIARY BUTANOL
Walter Krönig, Wolfgang Swodenk, Matthieu Quaedvlieg, and Wulf Schwerdtel, Leverkusen, and Günther Boehmke, Cologne-Flittard, Germany, assignors to Farbenfabriken Bayer Aktiengesellschaft, Leverkusen, Germany, a corporation of Germany
No Drawing. Filed Jan. 21, 1963, Ser. No. 252,570
Claims priority, application Germany, Jan. 24, 1962, F 35,841; Apr. 21, 1962, F 36,616
13 Claims. (Cl. 260—641)

This invention relates to a process for the production of tertiary butanol from i-butene. It is known that i-butene, either alone or mixed with other hydrocarbons, preferably with $C_4$ hydrocarbons, may be converted into tertiary butanol by adding a molecule of water in the presence of acid cation exchangers which contain sulfonic acid groups. For a continuous process which is the only method to be used on a technical scale cation exchangers fixed in the reaction chamber have been described. The reaction components may be conducted upwards or downwards through the bed of solids. Reference has already been made in the literature to the fact that the yield is lower if the reaction components flow upwards, and that a downward flow process is preferable. Repetition of the described process has confirmed this observation. However, it is recognized that there are basic difficulties involved in a downward flow process. At the beginning of the process, the reaction takes place according to expectation, but side reactions then occur to an increasing degree, such side reactions including the formation of polymers of i-butene, particularly diisobutene and triisobutene, as well as smaller quantities of codimers of i-butene and n-butene. Simultaneous formation of alcohol and of hydrocarbon polymers makes it very difficult to work up the reaction products.

Another serious disadvantage of this method is that the flow through the catalyst bed is laminar, so that as the reaction components only move slightly, it is very difficult to remove the very considerable heat of reaction. In any case, the process must be carried out in narrow tubes, and this means that it is necessary to use a large number of parallel tubes in which it is practically impossible to ensure uniform distribution of the immiscible reaction components.

For the discontinuous process which, as already mentioned above, is not suitable on a technical scale, the use of catalysts accompanied by vigorous stirring or shaking of the reactor contents has been described. Furthermore, it is known that after the reaction the catalyst may be removed by filtration or decanting from the reaction products in which it is suspended. This procedure is, of course, very expensive and difficult because there is a mixture of two phases (aqueous phase and hydrocarbon phase) and, moreover, the $C_4$ hydrocarbons make it necessary to employ pressure for separating the solids. It is certainly on account of these difficulties that a continuous process accompanied by vigorous stirring of the reaction components has not been carried out or described.

It is an object of the present invention to avoid the aforementioned disadvantages. A further object is to provide a continuous process for the production of tert. butanol. Still more objects will appear hereinafter.

It has now been found that these objects can be attained and that the difficulties occurring in a continuous process may be prevented by converting i-butene into tertiary butanol by a hydrating process in the presence of cation exchangers which contain sulfonic acid groups, the reaction components being mixed vigorously during the process; the i-butene, water and acid cation exchanger which serves as catalyst are conducted in the liquid phase at temperatures of 50 to 130° C. and pressures of 10 to 30 atmospheres through one or more reactors in which the contents are intimately mixed, and then into a separator in which the product is separated into its phases while the reaction pressure is maintained, namely into the hydrocarbon layer which contains the alcohol formed in the reaction and into the aqueous solution in which the catalyst is suspended. The aqueous phase with the catalyst, still under the reaction pressure, is returned to the inlet of the reaction chamber and water is added in a quantity corresponding to the amount of bound or dissolved water removed from the reaction system with the hydrocarbon layer, and the hydrocarbon layer is separated by distillation into unreacted hydrocarbons on the one hand and alcohols including the water dissolved therein on the other hand.

In practice, the process may be carried out as follows: The reaction components, e.g. the $C_4$ hydrocarbon mixture whcih contains i-butene and water essentially free from ions, are introduced into the reactor in proportions varying from about 20:80 to 80:20. The aqueous phase contains about 10 to 60% by weight of the cation exchanger, calculated on the anhydrous ion exchanger. The reactor is a vessel in which the reaction components are intensively mixed by a stirrer. One reactor may be used, but it is generally preferable to use several reactors for example 2 or 3 to 8 reactors connected in series so that the reaction components may be passed through the whole series of reactors. The pressures employed are such that at the temperature of the reaction the components remain in the liquid state. The reaction products together with the ion exchangers (catalysts) contained therein pass from the last reactor into a separator in which the two immiscible layers are separated, namely the upper hydrocarbon layer and the lower aqueous layer. The catalyst is suspended in the aqueous layer. The aqueous layer together with the catalyst suspended in it is withdrawn from the bottom of the separator and returned to the first reactor still under the reaction pressure. Fresh water is added to the reactor but only in an amount corresponding to the amount used in the formation of the alcohol and the amount dissolved in the organic phase. It is immaterial at what point the fresh water is added. A settling vessel may be interposed into the recycle system of the aqueous layer containing the catalyst. A small fraction, calculated on the fresh water introduced, may be removed from this settling vessel containing catalyst of small particle size which has formed by abrasion and which is preferably removed. These small quantities of aqueous suspensions of minute catalyst particles may either be neutralized directly and then introduced into the working up the hydrocarbon layer or they may be conducted after having been released through another separator system, for example a centrifuge to obtain more complete separation between the coarser particles which may be returned to the reaction and the smallest particles which are best removed. The catalyst is constantly circulated through the reactor in the form of an aqueous suspension and remains thereby practically always under the pressure which exists in the reactor, so that it is not exposed to stress due to release of pressure. Furthermore, it is not necessary, as described in the literature, to carry out the complicated separation of catalyst from the system of hydrocarbons, water and solids. The layers are separated in the separator connected to the reactor, without the use of special apparatuses. Owing to the fact that in this method of the invention in contrast to the method in which the components are conducted through a solid bed, each catalyst particle remains completely surrounded by water, the catalyst fully maintains its activity for a very long time. If the activity of the catalyst charge circulating through the apparatus diminishes slightly, a small portion of the circulating catalyst may easily be removed in the form of an aqueous suspension and replaced by a small quantity of fresh catalyst. This is, of course, very much simpler than replacing a solid catalyst bed. The consumption of fresh catalyst calculated by weight amounts to only a few parts per thousand of the alcohol produced. A portion of the alcohol formed in the reaction remains in the aqueous layer. It has been discovered that this alcohol may be returned to the reactor without impairing fresh formation of alcohol from the reaction components. The final effect is that the alcohol formed in the reaction, which is extracted from the aqueous phase by the hydrocarbons, is removed from the system only in solution in the hydrocarbons. It is therefore not necessary to recover the alcohol from the aqueous phase. The unconverted $C_4$ hydrocarbons may be removed in the usual manner from the hydrocarbon phase, e.g. by distillation. The remaining alcoholic distillation residue is preferably redistilled to remove traces of polymers which may have formed. The tertiary butanol obtained is very pure, apart from the water contained in it, and is ready for use or may be further purified or converted into another product. It should be mentioned here that there is no difficulty in producing i-butene of a high degree of purity from this very pure tertiary butanol.

The usual reaction vessels with stirrers are suitable for use as reactors, but vertical containers may also be used, in which the contents are moved vertically by means of propellers or similar stirring devices, e.g. downwards through a central tube or upwards through the annular chamber or conversely. It is also possible to use reactors arranged in the form of loops in which the components may be moved downwards through one arm and upwards through the other. Any other suitable arrangement may be used. A particular advantage of the process according to the invention lies in the fact that the removal of the heat of reaction presents no difficulty. The reactors themselves may be cooled either through the wall of the reaction vessel or through cooling systems installed in the reactor, but equally well the heat may be removed by cooling the pipes connecting the separate reactors; by this system, it is possible to control the temperature at which the reaction components enter the individual reactors, and thereby to control the reaction temperature. The removal of the heat of reaction in all these arrangements is very much simpler than in processes using fixed catalyst beds.

In another method of carrying out the process according to the invention, water-soluble, non-ionogenic and/or anion active emulsifiers are added in small quantities to the reaction components. This makes it very much simpler to mix the reaction components and it is therefore not necessary to stir so intensely.

One would have expected that an improvement in the formation of emulsion in the reactor would impair the separation into phases in the separator following the reactor, because if the three phases, namely the hydrocarbon phase, aqueous phase and solid phase are intensively emulsified or suspended in the reactor, one would expect this to occur also in the separator, so that the separator could no longer satisfactorily separate the reaction components into a hydrocarbon phase on the one hand and aqueous phase containing solids on the other. But it was unexpectedly found that by adding the said emulsifiers, the emulsion formation in the reactor could considerably be improved without impairing the separation in the separator. In fact, it was found that the addition of the said emulsifiers even accelerated the phase separation in the separator. It has been found that it is possible by adding the said emulsifiers in small quantities to the reaction components to reduce the speed of stirring to half or even one third of that required when no emulsifier is added, without in any way impairing the reaction. The mechanical stress on the catalyst, leading to undesirable disintegration of the catalyst into fine grains, is reduced by lowering the intensity of stirring to about half and in some cases even further.

Particularly suitable aqueous non-ionogenic emulsifiers which may be used for the present purpose are polyglycol ethers which may be prepared by polyaddition of alkylene oxides to compounds containing active hydrogen atoms, e.g. alcohols or polyalcohols, mercapto compounds, carboxylic acid, carboxylic acid amides, phenols and amines. Polyalkylene glycols may be used which have been prepared, for example, by the addition of propylene glycol and/or butylene glycol to polyalcohols, e.g. saccharose, in conjunction with addition of ethylene oxide.

The anion active emulsifiers suitable for the process of the invention include higher molecular weight aliphatic or araliphatic sulfonic acids, sulfuric acid esters etc.

These emulsifiers must meet the following requirements: They must be soluble in water and their HLB value ("hydrophilic-lipophilic balance") must be so adjusted that they are insoluble or only very slightly soluble in hydrocarbons.

These emulsifiers may be used in concentrations in the aqueous phase of 0.1 to 5 g. per litre, preferably 0.5 to 3 g. per litre. Owing to the high solubility of these emulsifiers in water and their insolubility in hydrocarbons, only small quantities of emulsifiers corresponding to the solubility of the water in the hydrocarbon-tertiary butanol phase will enter the hydrocarbon phase. The emulsifiers in the hydrocarbon phase may be recovered in the process of working up the hydrocarbon phase by removing the hydrocarbons, tertiary butanol and a considerable proportion of water by distillation and returning the residue directly to the reaction system or, if higher boiling hydrocarbons have accumulated, aqueous extraction from the residue may be carried out.

$C_4$ hydrocarbon mixtures containing 20 to 100% i-butene may be used as raw materials for the process of the invention. $C_4$ hydrocarbons containing 25 to 50% i-butene are often available from cracking processes. If the $C_4$ hydrocarbons contain butadiene, this must first be removed. Large quantities of butadiene are generally removed by recovering the butadiene in a form in which it can be used, whereas small quantities may be removed in the liquid phase, for example by selective hydrogenation. Butadiene contents below 0.5% in the $C_4$ stream generally need not be removed. The $C_4$ hydrocarbons used as raw material generally contain n-butene in addition to i-butene and can contain furthermore butanes.

Catalysts suitable for the new process are cation exchangers which contain sulfonic acid groups and which have been obtained by polymerization or copolymerization of aromatic vinyl compounds followed by sulfonation. Examples of aromatic vinyl compounds suitable for preparing polymers or copolymers are: styrene, vinyl toluene, vinyl naphthalene, vinyl ethylbenzene, methyl styrene, vinyl chlorobenzene and vinyl xylene. A large variety of methods may be used for preparing these polymers, for example polymerization alone or in admixture with other monovinyl compounds, or by crosslinking with polyvinyl compounds, for example with divinyl benzenes, divinyltoluenes, divinylphenylethers and others. The polymers may be prepared in the presence or absence of solvents or dispersing agents, and various polymerization initiators may be used, e.g. inorganic or organic peroxides, persulfates etc.

The sulfonic acid group may be introduced into these vinyl aromatic polymers by various known methods, for example by sulfating the polymers with concentrated sulfuric acid or chlorosulfonic acid or by copolymerizing aromatic compounds which contain sulfonic acid groups (see e.g. U.S. patent specification 2,366,007). Further sulfonic acid groups may be introduced into these polymers which already contain sulfonic acid groups, for example by treatment with fuming sulfuric acid, i.e. sulfuric acid which contains sulfur trioxide. The treatment with fuming sulfuric acid is preferably carried out at 0 to 150° C., and the sulfuric acid should contain sufficient sulfur trioxide so that it still contains 10 to 50% free sulfur trioxide after the reaction. The resulting products preferably contain an average of 1.3 to 1.8 sulfonic acid groups per aromatic nucleus. Particularly suitable polymers which contain sulfonic acid groups are copolymers of aromatic monovinyl compounds with aromatic polyvinyl compounds, particularly divinyl compounds, in which the polyvinyl benzene content is preferably 1 to 20% by weight of the copolymer (see, for example, German patent specification 908,247).

The ion exchanger is preferably used in a finely granular form, e.g. with a grain size of 10 to 250$\mu$, preferably 20 to 100$\mu$. When working with a solid bed, relatively coarse granules of about 0.15 to 1 mm. must be used to ensure that the catalyst bed is sufficiently permeable to the reaction component. When the finely granular catalyst is used according to the invention, the surface available for the reaction is much greater, and the acceleration of the reaction obtained is correspondingly greater. The concentration of cation exchanger in the aqueous phase is preferably about 10 to 60% by weight calculated on the anhydrous ion exchanger.

The process according to the invention is preferably carried out at elevated temperatures, e.g. at temperatures between 50 and 130° C., preferably 80 to 120° C. The reaction temperature may also be maintained in the separating vessel. However, if desired, the separator may be kept at a lower temperature.

As already mentioned above, the pressure is so adjusted that the reaction components are in the liquid state. For example, pressures between 10 and 30 atmospheres, preferably between 15 and 25 atmospheres may be employed. The components may remain in the reaction chamber e.g. for about 10 to 90 minutes, preferably 20 to 60 minutes.

The conversion of n-butene to secondary butanol may be almost completely avoided. Only traces of hydrocarbon polymers are formed. The remaining hydrocarbon layer still contains varying quantities of i-butene. These may for example be converted into oligomers to produce a $C_4$ fraction which is practically free from i-butene.

*Example 1*

A $C_4$ fraction of the following composition was used as raw material:

| Component: | Weight percent |
|---|---|
| i-$C_4H_8$ | 47 |
| n-$C_4H_8$ | 43 |
| $C_4H_{10}$ | 10 |
| | 100 |

The catalyst used was a sulfated polystyrene cross-linked with 16% divinylbenzene and having an average content of 1.6 sulfonic acid groups per aromatic nucleus. The grain size of the catalyst was 25 to 100/$\mu$.

A reaction vessel of 22 litres' capacity equipped with stirrer was used.

10.3 kg. of the $C_4$ fraction defined above, 17.9 kg. of aqueous solution circulating in the reaction, 5.1 kg. catalyst returned from the reaction (calculated in dry weight), and 0.83 kg. non-ionic fresh water were introduced per hour into the reactor.

The reactor was maintained at a temperature of 110° C. The pressure was 25 atmospheres. The reaction mixture was introduced at the same pressure and the same temperature into a vertical separator. The solution in which the catalyst was suspended was removed from the bottom of the separator and pumped back into the reactor. The hydrocarbon solution was removed from the top of the separator and distilled.

2.62 kg. tertiary butanol (calculated anhydrous), 0.19 kg. water, and 8.3 kg. of a $C_4$ fraction containing 34.5% i-butene were obtained per hour.

Only traces of secondary butanol and oligomers were formed.

*Example 2*

A $C_4$ fraction of the following composition

| Component | Weight percent |
|---|---|
| i-$C_4H_8$ | 47 |
| n-$C_4H_8$ | 43 |
| $C_4H_{10}$ | 10 |
| | 100 | was used as raw material.

The catalyst was a sulfated polystyrene cross-linked with 16% divinyl benzene. The grain size of the catalyst was 25 to 100/$\mu$. A vessel of 22 litres' capacity equipped with stirrer rotating at 150 revolutions per minute was used.

10.5 kg. of the above $C_4$ fraction, 18.4 kg. aqueous solution from the reaction cycle, 6.6 kg. returned catalyst (calculated dry), 0.92 kg. fresh water free from cations and 0.038 kg. emulsifier were introduced per hour into this reactor.

The emulsifier was prepared by reacting 80 mols propylene oxide with 1 mol saccharose and then adding 70 mols ethylene oxide.

The aqueous circulating solution constantly contains 95% of the quantity of emulsifier indicated above. Only 5% is removed from the system with the hydrocarbon layer and it is recovered by the distillation of the hydrocarbon layer and returned to the system. The reactor was maintained at a temperature of 110° C. The pressure was 25 atmospheres. The reaction mixture was at the same pressure and the same temperature when it reached the vertical separator. The cycle stream, containing the catalyst in suspension and the emulsifier in solution, was removed from the bottom of the separator and pumped back to the reactor without release of pressure. The hydrocarbon solution was removed from the top of the separator and worked up by distillation.

2.91 kg. tertiary butanol (calculated anhydrous), 0.18 kg. water, 8.2 kg. of a $C_4$ fraction containing 32.7% i-butene and 0.002 kg. emulsifier were obtained per hour.

When the same starting materials were used in the same apparatus and under the same reaction conditions but without addition of emulsifier, the hourly yield of tertiary butanol (calculated anhydrous) was only 0.87 kg. When the stirrer revolved at 300 revolutions per minute, the hourly yield of tertiary butanol was 2.33 kg. and a value equal to that obtained with emulsifier was obtained only at a rate of 400 revolutions per minute.

We claim:

1. In the continuous process for producing tertiary butanol from i-butene by hydration in the presence of a cation exchange catalyst containing sulfonic acid groups, the improvement of introducing a butene containing-hydrocarbon, water, and the acid cation exchange catalyst in the liquid phase at a temperature of 50 to 130° C. and a pressure of 10 to 30 atmospheres into a reaction zone, vigorously agitating said butene containing-hydrocarbon, water and catalyst in said reaction zone whereby an intimate mixture is formed, passing said mixture into a separation zone maintained at the same pressure as said reaction zone, separating the reaction mixture into a hydrocarbon phase containing the butanol formed, and an aqueous phase in which the catalyst is suspended, returning the aqueous phase containing catalyst without release of pressure to said reaction zone, together with an amount of water corresponding to that amount of water removed from the system in the hydrocarbon phase, subjecting the hydrocarbon phase to distillation, and separately recovering unreacted hydrocarbon and tertiary butanol together with any water dissolved therein.

2. Improvement according to claim 1, which comprises that a $C_4$ fraction is used which contains i-butene.

3. Improvement according to claim 1, which comprises introducing into the reaction the hydrocarbons and the water in a wt. percent ratio which lies between 20:80 and 80:20.

4. Improvement according to claim 1, which comprises passing said butene containing-hydrocarbon, water, and acid cation exchange catalyst into and through 2–8 reaction zones connected in series.

5. Improvement according to claim 1, which comprises that the aqueous phase entering the reaction chamber contains 10 to 60% by weight of catalyst.

6. Improvement according to claim 1, which comprises that the catalyst entering the reaction chamber has a grain size of 10 to 250/$\mu$.

7. Improvement according to claim 1, which comprises that a portion of the smallest catalyst particles suspended in the aqueous phase are removed from the recycled aqueous phase.

8. Improvement according to claim 1 wherein said catalyst is a sulfated polystyrene cross-linked with divinyl benzene.

9. Improvement as claimed in claim 1, which comprises that emulsifiers are used which are obtained by polyaddition of alkylene oxides to compounds containing active hydrogen atoms.

10. Improvement according to claim 1, which comprises carrying out said reaction in the presence of an emulsifier soluble in water and having a hydrophilic-lipophilic balance adjusted so that said emulsifier is at the most only slightly soluble in the hydrocarbon.

11. Improvement as claimed in claim 10, which comprises using the emulsifiers in an amount of 0.1 to 5 g. per liter of aqueous phase.

12. Process according to claim 10, wherein said emulsifier was prepared by reacting propylene oxide with saccharose and ethylene oxide.

13. Improvement as claimed in claim 10, which comprises recovering the emulsifiers contained in the hydrocarbon layer and adding these emulsifiers to the recycled aqueous phase.

References Cited
UNITED STATES PATENTS

| | | | |
|---|---|---|---|
| 2,112,793 | 3/1938 | Stanley et al. | 260—641 |
| 2,178,186 | 10/1938 | Oldershaw | 260—641 |
| 2,477,380 | 7/1949 | Kreps et al. | 260—641 |
| 2,813,908 | 10/1954 | Young | 260—641 |
| 3,164,641 | 1/1965 | Bazzarin | 260—641 |

OTHER REFERENCES

Heister et al., "Chemical Engineering" (October 1954), pp. 172, 173.

Schwartz et al., "Surface Active Agents," vol. 1 (1949), pp. 202–3.

LEON ZITVER, *Primary Examiner.*

M. B. ROBERTO, J. E. EVANS, *Assistant Examiners.*